United States Patent
Schumacher

(10) Patent No.: US 7,343,851 B2
(45) Date of Patent: Mar. 18, 2008

(54) KNOTTER HOOK AND CORD KNOTTER EQUIPPED WITH THE SAME

(75) Inventor: Heinz-Günter Schumacher, Eichelhardt (DE)

(73) Assignee: Rasspe Systemtechnik GmbH & Co. KG, Soligen (DE)

( * ) Notice: Subject to any disclaimer, the term of this patent is extended or adjusted under 35 U.S.C. 154(b) by 843 days.

(21) Appl. No.: 10/362,470

(22) PCT Filed: Jun. 11, 2002

(86) PCT No.: PCT/EP02/06355

§ 371 (c)(1),
(2), (4) Date: Jun. 13, 2003

(87) PCT Pub. No.: WO03/000552

PCT Pub. Date: Jan. 3, 2003

(65) Prior Publication Data

US 2004/0045452 A1    Mar. 11, 2004

(30) Foreign Application Priority Data

Jun. 21, 2001    (DE) ............................ 201 10 161 U

(51) Int. Cl.
B65B 13/26 (2006.01)
B65H 69/04 (2006.01)
(52) U.S. Cl. ................. 100/33 R; 140/101; 289/11
(58) Field of Classification Search .............. 100/33 R; 140/101; 289/2, 5, 8, 10, 11, 14
See application file for complete search history.

(56) References Cited

U.S. PATENT DOCUMENTS

| 983,922 | A | * | 2/1911 | Moore | 289/11 |
| 1,523,471 | A | * | 1/1925 | Benjamin | 289/11 |
| 2,793,890 | A | | 5/1957 | Smith | |
| 4,022,501 | A | | 5/1977 | White | |
| 4,735,446 | A | | 4/1988 | Homberg | |

\* cited by examiner

*Primary Examiner*—Jimmy T. Nguyen
(74) *Attorney, Agent, or Firm*—Fay Sharpe LLP

(57) ABSTRACT

A twine knotter (10) for bale compactors comprises a knotting frame (11) with a knotting hook (9), supported rotatably on a knotting hook shaft (40), which forms a swivel pin in the knotting frame (11); with a hook part (41), projecting laterally from the knotting hook shaft (40), which hook part has a continuous through-opening (52) with an approximately rectangular cross section, this opening extending in the plane formed by the knotting hook shaft (40) and the hook part (41), the side boundaries of the opening being formed by cheeks (63, 64). A knotting tongue (44) is supported on the knotting hook (9) with freedom to pivot around a pivot pin (43), which is perpendicular to the plane formed by the knotting hook shaft (40) and the hook part (41) and which passes transversely through cooperating bores (65, 66, 67) in the cheeks (63, 64) and the knotting tongue (44). An internal projection, which extends radially inward in front of the end surface (43') of the pivot pin (43), is provided In the cooperating bore (66) passing through the cheek (64) of the opening (52). The outer edge of the cooperating bore (65) passing through the other cheek (63) is peened over in front of the end surface (43") of the pivot pin (43) present there.

6 Claims, 3 Drawing Sheets

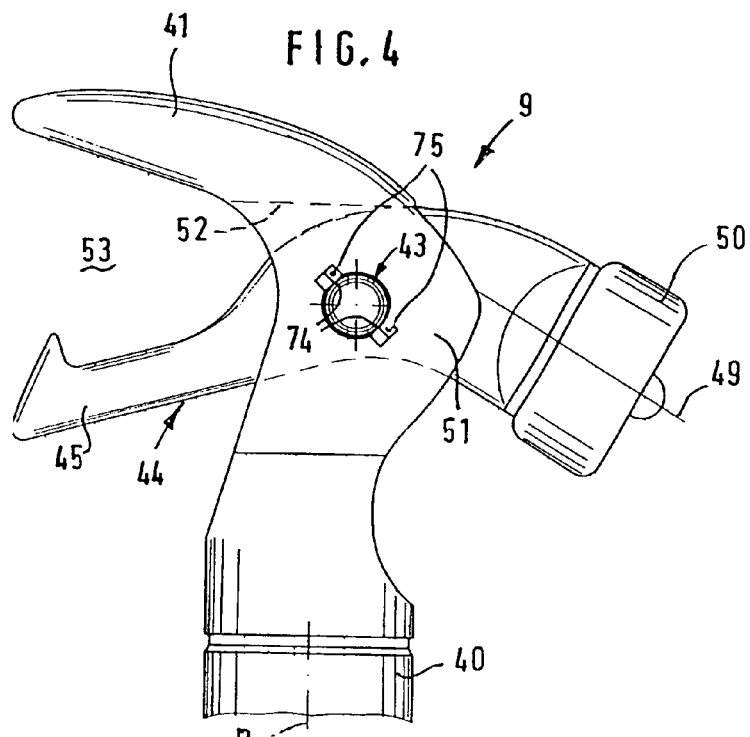
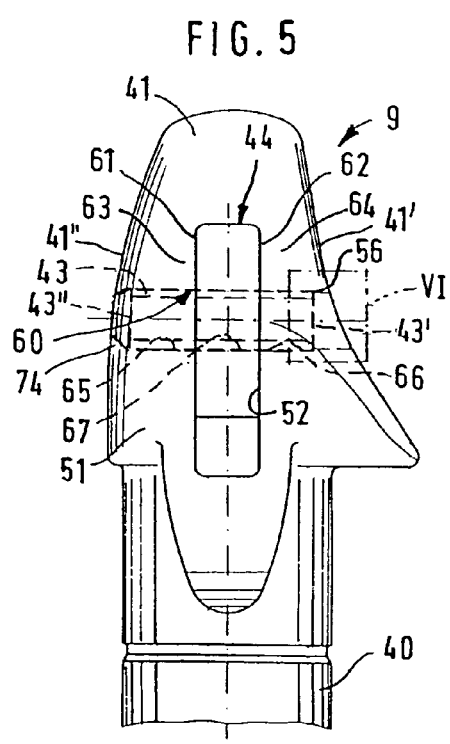
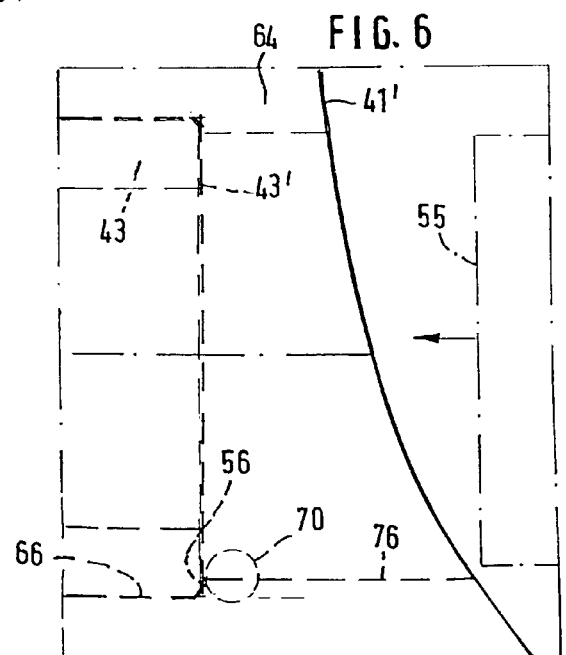

KNOTTER HOOK AND CORD KNOTTER EQUIPPED WITH THE SAME

BACKGROUND OF INVENTION

The invention pertains to a knotting hook and to a twine knotter equipped therewith.

Twine knotters of this type have been known for many years under the name "McCormick system" and are described on pages 128-131 of the book "Landmaschinenlehre" [Textbook of Agricultural Machinery"], Vol. II, by Prof. Heinrich Heyde, Dr. Eng. (editor), VEB Verlag Technik Berlin, Berlin 1965.

Twine binders or twine knotters of this type are used in bale compactors for straw, hay, and similar materials and also in the recycling field, for example, to tie up bundles of paper, textiles, thin sheets of metal, and the like. Twine binders are also used in machines for tying small bundles of stalky material with twine. "Stalky material" in this case consists primarily of agricultural or horticultural products such as leeks, onion necks, grafting understock, flowers, individual plants with their branches such as rose bushes, etc. Binding machines or binding devices of this type, however, can also be parts of packaging systems for typing packages, bales, and bundles of materials suitable for being tied into bundles.

In stationary or mobile compactors, the material in question is packed into a compaction channel with a rectangular cross section. Block-like units, also called bales, are sectioned off from the rectangular strand of compacted material; these bales are then wrapped with binding twine in planes parallel to the direction of the channel. Before the bale is ejected from the compaction channel, the twine is knotted to form a closed loop. In the case of simple built-in knotters, the strand of twine is cut off from the knot and clamped in position until the next wrapping operation. When double knotters are used, the two strands of twine are clamped only during the period between the tying of the first and the tying of the second knot. The processes of knotting, cutting off, and clamping are handled by the twine knotter.

Depending on the width of the block-like bale and the pressure prevailing inside it, one or more twine knotters are mounted next to each other on a common drive shaft in the compactor. The number of knotters and the number of compactor components which supply the strands of twine, namely, the so-called compactor needles, are determined by the number of times the bale must be wrapped with twine.

The drive shaft is located either above or below the essentially horizontal compaction channel. If the compaction channel is in another position, the drive shaft is mounted alongside it.

If a simple knotter is installed, the compactor needle guides the length of twine required to loop around and to tie the bale to the twine knotter, the twine thus being carried around behind the block-shaped bale, which has been cut off behind the compactor piston, which moves back and forth in the longitudinal direction of the compaction channel. After reaching the knotter, the twine is laid over the tongue of the knotting hook and carried further onward to the twine clamping device. From the latter, the end of the previously mentioned strand proceeds over the knotting tongue to the reversing edge of the knife lever and from there passes around the entire bale. If a double knotter is installed, both the part of the strand passing over the top and also the part of the strand extending along the bottom of the bale are conveyed by the compactor needle over the tongue of the knotting hook to the twine clamping device.

In the case of binding machines of the type described above, the material to be tied into a bundle is placed on a work table, which can be either horizontal or slanted. A crescent-shaped knotting needle guides the strand of twine around the bundled material, so that the end which is being held tightly in the knotter and the stand which has been wrapped around the bundle meet each other in the knotter, so that the knot can then be tied.

So that a complete and lasting knot can be tied, the knotting tongue, which is mounted pivotably on the knotting hook and which cooperates with the hook part of the knotting hook to form the so-called "knotting jaws", must rest firmly on the hook part of the knotting hook before the knotting procedure is begun, or, expressed in different words, the knotting jaws must be kept closed. For this purpose, a spring-loaded closer presses against a tongue roller, which is rotatably supported at the rear of the knotting tongue. When the knotting hook rotates once around itself to form the loops of the knot, the roller of the knotting tongue is guided over a curved track, so that the knotting jaws, which are still closed at this point, open up just before the hook completes its rotation. The jaws open just enough to allow the two strands of twine, which are being held under tension between the twine holder and the knotting hook, to slide between the knotting jaws. After the hook has rotated a complete 360°, the jaws close again. The two previously mentioned strands are cut by the knife attached to the knife lever, and the knot loops formed by the knotting hook are stripped off the cut ends of the strands by the stripping comb of the knife lever. A loose knot is thus obtained, which acquires its final state as a strong, tight knot after completion of the stripping process by the action of the tensile force exerted by the material which has been compacted and tied and which keeps trying to expand outward again.

The adjustable pressure which the closer applies to the tongue roller will vary as a function of the weight of the bale and thus also on the thickness of the required compacting twine. The designs of the knotting hook, of the knotter tongue, and of the associated tongue roller will also vary as a function of the thickness of the twine.

Shortly before the rotation of the knotting hook, as already mentioned, the two strands to be knotted together lie on the tongue of the knotting hook. The knotting jaws are kept closed by this contact pressure and by the pressure being applied by the closer to the tongue roller. A continuous closing pressure is also exerted on the knotting jaws during the rotation of the knotting hook.

The knotting tongue, which passes through a rectangular opening in the head of the knotting hook, is supported with freedom to pivot on a pivot pin in the knotting hook. This pin consists either of solid material (a straight pin) or of a piece of wound sheet metal (dowel sleeve, spiral pin). By suitable selection of the bore tolerances, this pin can be held in the knotting tongue so that the ends of the pin can rotate in the two cheeks at the sides of the rectangular opening in the head of the hook, or the pivot pin can be fixed in position in the previously mentioned cheeks, so that the knotting tongue can rotate around it.

As a result of the tension exerted by the compacting twine and/or the force of the closer, the load which acts on the pivot pin can be considerable. Use in the field has shown that these loads can occasionally cause the pivot pin to slide in the axial direction until it projects out laterally from the head of the hook. The strands which have been looped around the head of the hook during the knotting operation can thus be damaged, and this can lead in turn to a significant decrease in the strength of the knot, which sometimes remains unnoticed when the knotter is being operated continuously.

The axial displacement of the pivot pin can be caused by: high compaction densities, which increase the tension in the twine to be knotted to such an extent that the resulting forces acting via the tongue can exert a damaging effect on the fitted seat of the pivot pin; an unfavorable combination between the manufacturing tolerances for the pin and those for the bores into which it fits; the dimensions of the pin and of the bores or their manufacturing tolerances are inconsistent and therefore imprecise; and, the failure to properly maintain the specified strength or hardness values of the pivot pin.

It is known that the axial displacement of the pivot pin can be prevented by designing the receiving bore in one of the cheeks of the knotting hook as a blind hole, that is, as a hole which is closed off by a wall at the bottom.

After the pivot pin has been pressed into place to a point just in front of the bottom of the bore, the edge around the bore in the opposite cheek of the opening is peened over in front of the end surface of the pivot pin located there in order reliably to secure the pivot pin in position.

This method of securing the pin suffers from the disadvantage that the knotting tongue cannot be removed after it has become worn out or damaged, because the bottom of the blind hole blocks off the end of the pin, which means that there is no place where a driver could be put to knock out the pin.

Thus, there is a need for knotting hook with a removable pivot pin. Even though the pivot pin is prevented from sliding out of place in the axial direction, it can nevertheless be removed with the help of driver when repairs are needed.

SUMMARY OF THE INVENTION

In accordance with one aspect of the invention, the bore in one of the cheeks of the knotting hook which holds the pivot pin is provided with an internal stop, which prevents the pivot pin from sliding out. The pivot pin can be driven in only up as far as the stop. The edge around the hole in the other cheek is peened over partially to secure the pin in the other direction.

Because the diameter of the outer area of the bore is only slightly reduced, the pivot pin offers an end surface against which a driver can be set when repairs are needed. As experiments have shown, the areas which were squeezed inward will be pushed back out again as the pivot pin is being driven out. After a replacement pin has been installed, the edge around the hole can be peened over again, although this should be done preferably at points which are offset from the areas peened over the first time.

In accordance with another aspect of the invention, a dimension which can be used for the radial projection of the internal projection into the open cross section of the stepped bore is in the range of a few tenths of a millimeter.

In accordance with yet another aspect of the invention, the internal projection can be formed by an internal circumferential shoulder in the bore, the bore thus being designed as a stepped bore. In this case, therefore, a continuous stop is present, which passes all the way around the inside circumference.

In accordance with still another aspect of the invention, the stop can be provided at only one point on the circumference. In this case, the stop can take the form of a transversion pin, which enters the bore from a point at the edge of the open cross section of the bore.

In accordance with yet another aspect of the invention, the internal projection to be provided on the side of the knotting hook subject to the greatest load by the compacting twine sliding by it.

Still other aspects of the invention will become obvious upon a reading of the following detailed description.

DESCRIPTION OF THE DRAWINGS

Further aspects of the invention will become apparent by reference to the detailed description when considered in conjunction with the Figures, wherein like reference numbers indicate like elements through the several views, and wherein:

FIG. 4 shows a side view of a knotting hook in accordance with the present invention;

FIG. 5 shows a view of the hook according to FIG. 4 from the left; and

FIG. 6 shows an enlarged view of the area designated "VI" in FIG. 5.

DETAILED DESCRIPTION OF THE EMBODIMENTS

Figure 1:
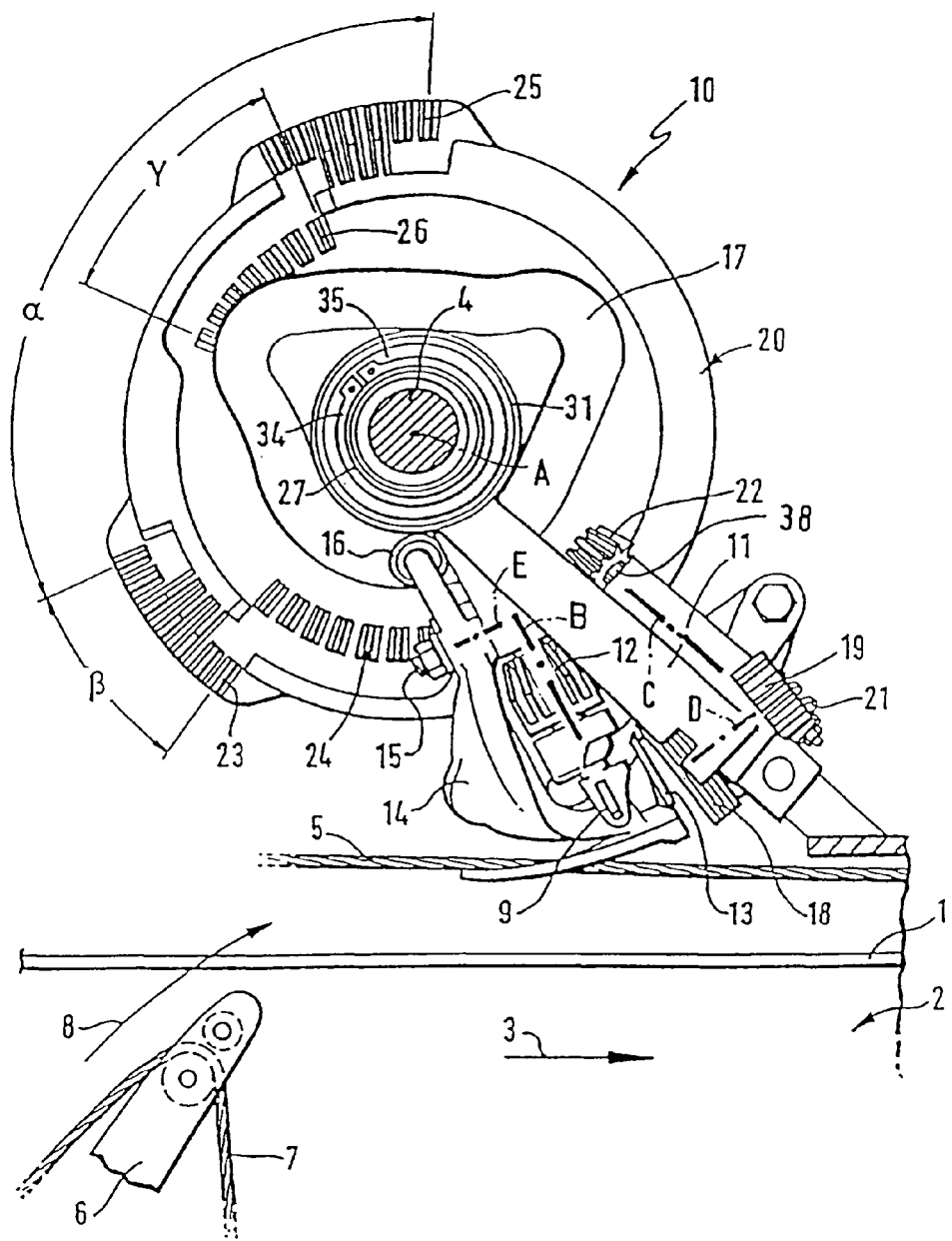
FIG. 1 shows a side view of a twine binder, mounted on the knotting shaft, looking in the direction of the knotting shaft, in accordance with one aspect of the invention.

Referring now in greater detail to the drawings wherein the showings for the purpose of illustrating preferred embodiments of the invention only and not for the purpose of limiting the invention, FIG. 1 shows the upper wall of a compaction channel 2, through which the compacted material such as straw is conveyed in the direction of the arrow 3. Above the compaction channel 2 and a certain distance above the upper wall, a knotting shaft 4, which extends transversely across the width of the compaction channel 2, is supported with freedom of rotation around its axis A, on which, depending on the width of the compacting channel 2, from two to six twine knotters 10 can be mounted. A loop of twine, which passes around the compacted bale in a vertical, longitudinal plane, is assigned to each twine knotter 10.

In the exemplary embodiment according to FIG. 1, each loop is closed by the formation of two knots, which are produced by the twine knotter 10. The strand 5 of twine passing over the top of the base comes from the end surface of the compacted bale facing in the transport direction 3. This strand is held under tension by means (not shown) installed on the left side of the twine knotter in FIG. 1. The compacting needle 6 guides another strand 7 of twine passing underneath the bale up around the rear-facing surface of the bale in the direction of arrow 8, so that the strand 7 can be brought together with the strand 5 in the area of the twine knotter 10, where the two strands are knotted together.

The twine knotter 10 comprises a knotting hook 9, which is mounted in the knotter frame 11 with freedom of rotation around an axis B, which is oriented radially with respect to the knotting shaft 4 and has an upward slant as shown in FIG. 1. This hook can be rotated around its axis B by pinion 12.

A movable knife 13 is mounted transversely with respect to the strands 5 and 7 of twine in order to cut them off after the knot has been tied. The knife 13 is attached to a knife lever 14, the shaft journal 15 of which can pivot around the axis E in a bearing in the knotting frame 11. The lever is actuated by a roller 16, which rides in a groove 17 in the knotting disk, designated 20 overall.

Twine holder 18 holds the strands 5 and 7 in position during certain work steps performed by the knotting hook 9 and the knife 13. This holder can rotate around an axis D, which points toward the front at an angle of approximately 45° in a vertical plane. The twine holder 18 includes the holder 18A itself and the driver 18B (FIG. 2), the shaft of which is guided in a bearing in the knotting frame 11. The driver is actuated by a pinion 19, which engages with a worm 21, which is itself driven by a pinion 22. The worm 21 is seated at one end of a pinion shaft 38 with the axis C, on the other end of which the pinion 22 is mounted.

In the case of knotters which tie only one knot on each rotation of the knotting drive disk, the pinions 12 and 22 are driven in each case by a toothed segment of the knotting disk. This tying method is described in detail in EP 0 237 771.

In the case of knotters which, as in the exemplary embodiment, produce two knots on each rotation of the knotting disk, however, the pinions 12 and 22 are driven by pairs of toothed segments 23, 24; 25, 26, which are mounted at the outer edge of the flat side of the knotting disk 20, i.e., the side facing the observer in FIG. 1. The toothed segments 24, 26 are identical to each other and are situated somewhat farther radially toward the inside, so that they can engage only with the pinion 22 when the knotting disk 20 rotates. The toothed segments 23, 25 are also identical to each other and are situated in the radially outermost area. They have the function of driving the pinion 12.

Upon rotation of the knotting disk 20 in the counterclockwise direction, furthermore, the toothed segments 25, 26 follow after the toothed segments 23, 24 by an angle α of approximately 115° in the circumferential direction. Each of the two toothed segments 23, 25 extends over an angle β of approximately 30°, whereas each of the toothed segments 24, 26 extends over an angle γ of approximately 40°.

Driven by the toothed segments 23, 24 and 25, 26, the knotter 10 shown in FIG. 1 quickly ties two knots during one rotation of the knotting disk 20, namely, a first knot, which connects the strand 7 coming up from behind the rear surface of the compacted bale to the upper strand 5 to form a closed loop of twine, and a second knot, which connects the strand coming up along the front surface of the following compacted bale to the strand passing along the top of the following bale to form a new loop of twine for the new bale to be formed. The binding twine is cut between the knots, so that the successive bales can be separated from each other.

Figure 2:
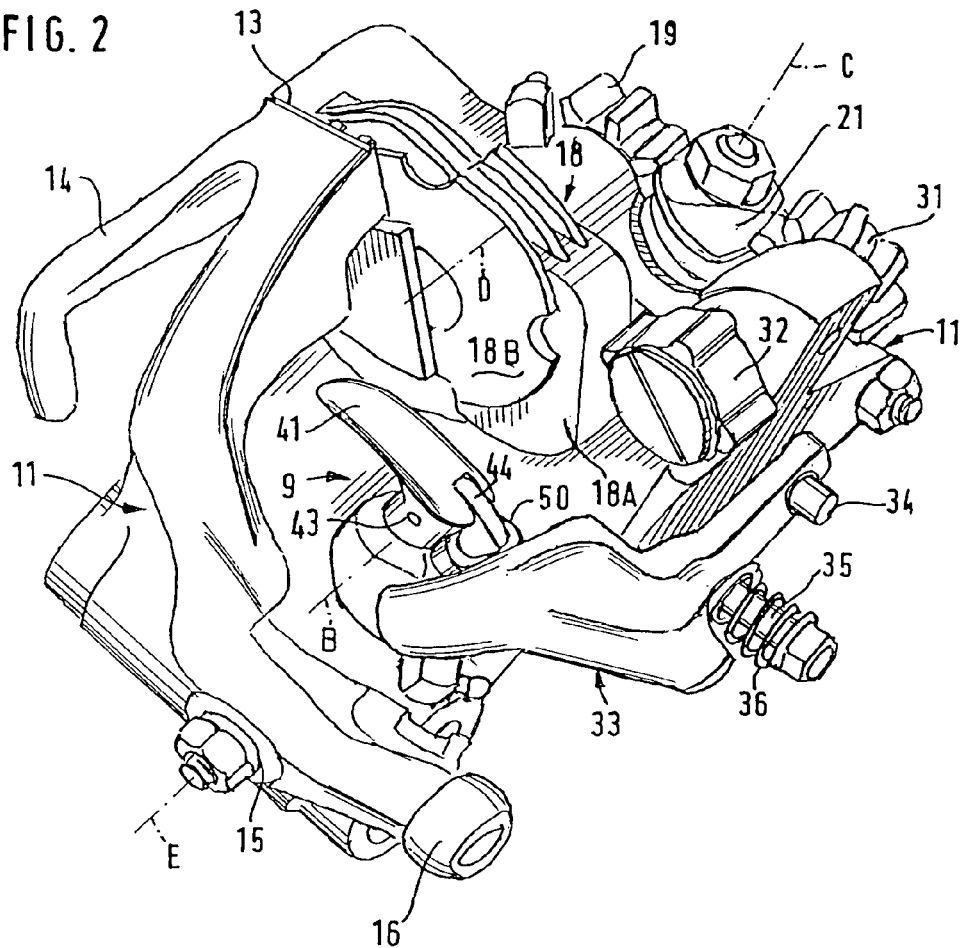
FIG. 2 shows a perspective view of the knotting device itself.

It can be seen in the diagram of FIG. 2 that a second pinion 31 also cooperates with the worm 21. A spring-loaded cam 32 is mounted on the other end of the shaft of this second pinion and exerts pressure periodically and elastically on the holder 18A, so that the holder is pressed firmly against the driver 18B and holds the twin especially firmly.

The "closer" 33 is mounted on the forward side, according to FIG. 2, of the knotting frame 11; the closer is designed as an elongated part and is held loosely on one end of a pin 34, which is seated in the knotting frame 11. A screw 35 passes through the closer approximately in the middle so that the closer 33 can be pushed by a helical compression spring 36 from the outside against the knotting frame 11. The free end of the closer 33 has a raceway on the side facing away from the observer in FIG. 2, on which the tongue roller 50 comes to rest upon rotation of the knotting hook 9 around the axis B. The force of the spring 36 has the effect of pressing the knotting tongue 44 firmly but elastically against the hook part 41 of the knotting hook 9 during the time that the tongue roller 50 is in contact with the closer, with the result that the knotting jaws 53 (FIG. 3) are kept very firmly closed.

Figure 3:
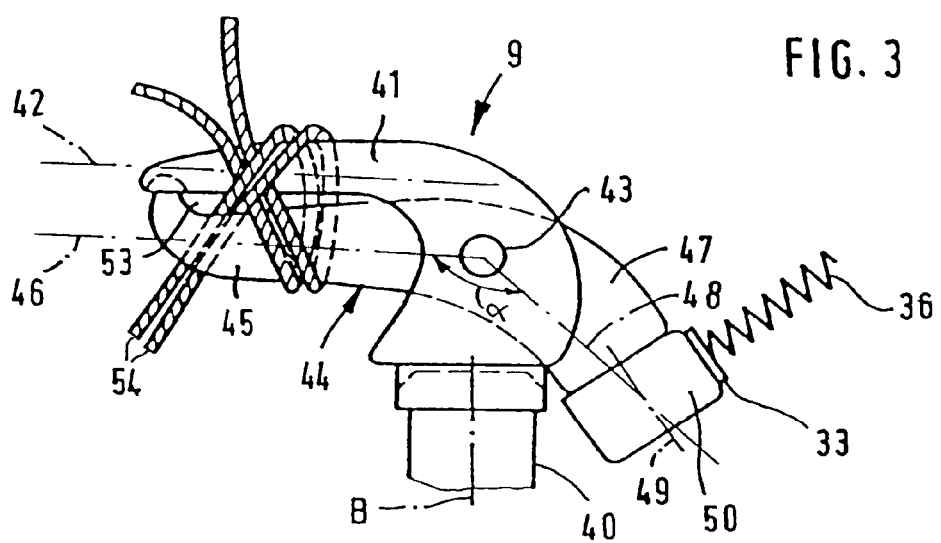
FIG. 3 shows a side view of a knotting hook according to the state of the art.

FIG. 3 shows a detailed view of a knotting hook 9 according to the state of the art. It comprises a cylindrical shaft 40 with the axis B, on which the hook is rotatably supported in the knotting frame 11 (FIG. 1). Permanently connected to the shaft 40 is the actual hook part 41 itself, which extends approximately in the direction of line 42, which is perpendicular to the axis B. The pivot pin 43, which is perpendicular to the plane determined by the axis B and the direction 42, is mounted approximately in the angled part of the hook. The knotting hook 9 has an internal opening, through which the knotting tongue 44 passes. This tongue is designed as a two-armed lever, the forward part 45 of which extends approximately in the direction 46, parallel to direction 42, along the hook part 41 of the knotting hook 9, whereas the rear part 47 extends approximately in direction 48, which forms an angle of approximately 120° with the direction 46. At the rear of the tongue part 47, a tongue roller 50 is mounted with freedom to rotate around an axis 49, which forms a small angle with the direction 48; the closer 33 described in conjunction with FIG. 2 acts on this roller, the closer itself being acted upon by an elastic force, indicated only schematically here in the form of a spring 36. This ensures that, during certain phases of the knot tying process, a torque acting in the counterclockwise direction according to FIG. 3 is exerted on the knotting tongue 44, under which force the knotting jaws 53 formed by the hook part 41 and the tongue part 45 are held in a closed position against the forces exerted by the strands 54 of twine.

With respect to the features described above, the embodiment of FIGS. 4-6 is the same as that of FIG. 3. In FIGS. 4-6, however, additional features are presented, which pertain to the means used to hold the pivot 43 in place axially.

The knotting tongue 44 is designed as a flat part with flat lateral surfaces 61, 62 (FIG. 5). It passes through a through-opening 52 of rectangular cross section in the head part 51 of the hook, formed by the angled area of the knotting hook 9. The opening is designed so that lateral surfaces 61, 62 of the tongue rest against the two longer boundary surfaces of the rectangular cross section of the opening 52. Inside the pass-through area, the knotting tongue 44 is supported pivotably on the head 51 of the hook by a pivot pin 43, which passes through the two cheeks 63, 64 at the sides of the opening in a direction perpendicular to the plane of the hook and is seated in aligned, cooperating bores 65, 66. The pin also passes through a cooperating bore 67 in the knotting tongue 44. The bores 65, 66, 67 together form a single, continuous bore 60, in which the pivot pin 43 is seated. The pin is either seated with a press-fit in the cooperating bore 67, so that the pivot pin 43 can rotate in the cooperating bores 65, 66 or seated with a press-fit in the cooperating bores 65, 66, so that the knotting tongue can rotate on the pivot pin 43 in the cooperating bore 67.

The pivot pin is pressed into the bore 60 from the left according to FIG. 5. At the end adjacent to the preferred contact surface 41' of the head 41 of the hook, that is, in the area of the cooperating bore 66, the bore has an internal shoulder 56, against which the end surface 43' of the pin 43 comes to rest when it is pressed in. The internal shoulder 56, however, projects radially only a few tenths of a millimeter into the inside, so that, in the outer area 76 of the cooperating bore 66, the open cross section is reduced only slightly, and in any case a major portion of the cross section of the end surface 43' of the pivot pin 43 is located in the open area of the outer part 76 of the cooperating bore 66. A driver 55, the diameter of which corresponds essentially to the diameter of the outer part 76 of the cooperating bore 66, can be passed through the outer part 76 of the cooperating bore 66 in the direction of the arrow and thus brought into contact with the end surface 43'. The pivot pin 43 can thus be driven out toward the left in FIG. 6. By itself, however, it cannot pass by the stop provided by the internal shoulder 56 and thus cannot project beyond the sliding surface 41', where it could damage the twine sliding along this surface under tension.

Instead of the internal shoulder 56, it would also be possible to use, as a stop, a transverse pin 70, extending in a direction perpendicular to the plane of the drawing according to FIG. 6. This pin would be pressed into the head 51 of the hook. If a transverse pin such as this is used, the cooperating bore 66 could be continuous; i.e., it would not have to have an internal shoulder 56. The transverse pin 70 should project only into the edge of the open cross section of the cooperating bore 66, so that the opening is left free for the passage of the driver 55.

In order to fulfill its function as a stop, it is necessary for the internal projection 56, 70 to project only a few tenths of a millimeter into the open cross section of the cooperating bore 66. However, it may not constrict the open cross section to such an extent that the driver 55 cannot pass through. This is to be taken into consideration especially when a hollow pivot pin 43 is used. In this case the driver 55 must have a cross section which is larger than the interior opening in the pivot pin 43, so that the driver can come to rest against the end surface 43'.

At the opposite end, the end surface 43" of the pivot pin 43 is somewhat lower than the outside surface 41", which is peened over at two opposite points 75 on the circumference, that is, pressed in a short distance in the axial direction, by means of a suitable chisel-like tool, as a result of which areas 74 of material are pushed radially inward in front of the end surface 43" and thus prevent the pivot pin 43 from moving from right to left in FIG. 5.

When the pivot pin 43 and/or the knotting tongue 44, both of which are subjected to heavy loads, are worn out or damaged, it is possible to use a driver 55 to reverse the effect of the peening 75, which means that the pivot pin 43 can then be pushed out toward the left by a few hammer blows on the driver 55 as shown in FIG. 6. After a new pivot pin 43 has been installed, a new peening operation can be performed at different points 75 on the circumference.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A knotting hook (9) for a twine knotter (10) for bale compactors, comprising:
  a knotting frame (11);
  a knotting hook shaft (40), which forms a swivel pin in the knotting frame (11) and rotatably supports the hook;
  a hook part (41), projecting laterally from the knotting hook shaft (40), said hook part has a continuous through-opening (52) with an approximate rectangular cross section, said opening extending in a plane formed by the knotting hook shaft (40) and the hook part (41), side boundaries of the opening being formed by cheeks (63, 64); and
  a knotting tongue (44), passing through the opening (52), said tongue is supported on the knotting hook (9) and pivots around a pivot pin (43), which is perpendicular to the plane formed by the knotting hook shaft (40) and the hook part (41) and which passes transversely through cooperating bores (65, 66, 67) in the cheeks (63, 64) and the knotting tongue (44), wherein an internal projection, which extends radially inward in front of an end surface (43') of the pivot pin (43), is provided in the cooperating bore (66) passing through the cheek (64) of the opening (52), and in that an outer edge of the cooperating bore (65) passing through the other cheek (63) is peened over in front of another end surface (43") of the pivot pin (43).

2. The knotting hook according to claim 1, wherein the internal projection extends a few tenths of a millimeter radially inward into an open cross section of the cooperating bore (66).

3. The knotting hook according to claim 1 wherein the internal projection is formed by a circumferential internal shoulder (56) in the cooperating bore (66) in the cheek (64).

4. The knotting hook according to claim 1 wherein the internal projection is formed by a transverse pin (70), which extends into an open cross section of the cooperating bore (66) in the cheek (64).

5. The knotting hook according to claim 1 wherein the internal projection (56, 70) is provided in an outer area of the cheek (64) across which binding twine slides.

6. A twine knotter for bale compactors, comprising:
  a knotting frame (11);
  a knotting hook (9), supported rotatably on a knotting hook shaft (40), which forms a swivel pin in the knotting frame (11);
  a hook part (41), projecting laterally from the knotting hook shaft (40), said hook part has a continuous through-opening (52) with an approximately rectangular cross section, said opening extending in a plane formed by the knotting hook shaft (40) and the hook part (41), side boundaries of the opening being formed by cheeks (63, 64);
  a knotting tongue (44), passing through the opening (52), said tongue is supported on the knotting hook (9) and pivots around a pivot pin (43), which is perpendicular to the plane formed by the knotting hook shaft (40) and the hook part (41) and which passes transversely through cooperating bores (65, 66, 67) in the cheeks (63, 64) and the knotting tongue (44);
  wherein an outer edge of one of the cooperating bores (65, 66, 67) passing through one of the cheeks (63, 64) is peened over in front of an end surface of the pivot pin (43).

* * * * *